United States Patent
Choudhry

(10) Patent No.: US 11,553,781 B2
(45) Date of Patent: Jan. 17, 2023

(54) COLLAPSIBLE TOOTHBRUSH AND CASE

(71) Applicant: Salman Choudhry, Lahore (PK)

(72) Inventor: Salman Choudhry, Lahore (PK)

(*) Notice: Subject to any disclaimer, the term of this patent is extended or adjusted under 35 U.S.C. 154(b) by 0 days.

(21) Appl. No.: 17/834,859

(22) Filed: Jun. 7, 2022

(65) Prior Publication Data

US 2022/0395083 A1 Dec. 15, 2022

Related U.S. Application Data

(60) Provisional application No. 63/210,081, filed on Jun. 14, 2021.

(51) Int. Cl.
| | | |
|---|---|---|
| *B65D 69/00* | (2006.01) | |
| *A46B 5/00* | (2006.01) | |
| *A61C 19/02* | (2006.01) | |
| *A61C 15/04* | (2006.01) | |

(52) U.S. Cl.
CPC .......... *A46B 5/0033* (2013.01); *A46B 5/0095* (2013.01); *A61C 15/041* (2013.01); *A61C 19/02* (2013.01); *B65D 69/00* (2013.01); *A46B 2200/1066* (2013.01)

(58) Field of Classification Search
CPC ....... A61C 15/04; A61C 19/02; A46B 5/0095; B65D 69/00
See application file for complete search history.

(56) References Cited

U.S. PATENT DOCUMENTS

| | | | |
|---|---|---|---|
| 1,435,641 A | | 11/1922 | Hines |
| 1,800,993 A | | 4/1931 | Funk |
| 4,828,113 A | * | 5/1989 | Friedland ............... A61B 90/90 206/570 |
| 4,890,349 A | * | 1/1990 | Nitzsche ............... A46B 7/042 15/176.5 |
| 5,044,386 A | | 9/1991 | Nelson |
| 5,247,718 A | | 9/1993 | Victorian |
| 5,348,028 A | | 9/1994 | Gustavel |
| 6,325,076 B1 | | 12/2001 | Ramirez |

(Continued)

FOREIGN PATENT DOCUMENTS

CN 212213006 U * 12/2020

OTHER PUBLICATIONS

Product literature: Boxed Portable Orthodontic Care Kit. PDF from: https://www.amazon.com/Portable-Orthodontic-Toothbrush-Patient-Interdental/dp/B08GX5XKMV , retrieved May 29, 2021.

(Continued)

*Primary Examiner* — Shay Karls

(74) *Attorney, Agent, or Firm* — Boris Leschinsky

(57) ABSTRACT

Disclosed herein is a novel toothbrush design and associated carrying case. In one embodiment the toothbrush may have a handle cylindrical in shape, and may break down into three separable sections, each joinable at threaded joints. One element may be configured to receive a removable bristle assembly. In one embodiment, the toothbrush elements may each be stored in separate compartments in the carrying case. The carrying case may also include a slidably extendible drawer configured to dispense floss. The carrying case may also include separate compartments for storing consumables such as toothpaste tablets and mouthwash tablets.

7 Claims, 5 Drawing Sheets

(56) References Cited

U.S. PATENT DOCUMENTS

| | | |
|---|---|---|
| 6,753,537 B2 | 6/2004 | Woo |
| 7,318,522 B2 | 1/2008 | Adam |
| 8,020,244 B2 | 9/2011 | Mashiko |
| 8,448,287 B2 | 5/2013 | Ponzini et al. |
| 9,770,316 B1 * | 9/2017 | Speed ..................... A61D 5/00 |
| 9,771,196 B1 | 9/2017 | Speed et al. |
| 9,961,985 B2 * | 5/2018 | Shigeno ............... A61C 17/224 |

OTHER PUBLICATIONS

Product literature: Portable Case Orthodontic Care Kit. PDF from: https://www.amazon.com/Portable-Orthodontic-Toothbrush-Patient-Interdental/dp/B08GWS5P2P , retrieved May 29, 2021.
Product literature: Toothbrush Travel Case Holder. PDF from: https://www.amazon.com/Toothbrush-Travel-Portable-Toothcup-Containers/dp/B08NFS4MXD , retrieved May 29, 2021.
Product literature: Toothbrush Case Portable Travel Capsule. PDF from: https://www.amazon.com/Toothbrush-Portable-Toothbrushes-Organizer-High-capacity/dp/B08QVQF5H3 , retrieved May 29, 2021.
Product literature: Dental Tools, Plaque Remover for Teeth. PDF from: https://www.amazon.com/Dental-Tools-Cleaning-Stainless-Remover/dp/B078R7ZX1W , retrieved May 29, 2021.

* cited by examiner

COLLAPSIBLE TOOTHBRUSH AND CASE

CROSS-REFERENCE TO RELATED APPLICATIONS

This application claims priority to and the benefit of U.S. provisional application Ser. No. 63/210,081 filed on Jun. 14, 2021 and entitled COLLAPSIBLE TOOTHBRUSH AND CASE, which is commonly owned and the contents of which are expressly incorporated herein by reference.

FIELD

The present invention relates to toothbrushes. More particularly, the present invention relates to collapsible toothbrushes and associated toothbrush carrying cases.

BACKGROUND

Traditional toothbrushes suffer from a variety of disadvantages, especially relating to portability, reusability, and ecological friendliness.

Regarding portability, the traditional toothbrush tends to be about six to seven inches long. This size is not convenient for travel nor carrying on one's person. It would be convenient if a quality toothbrush could be made portable by having one half to one third of the traditional size when being transported.

Also regarding portability, a number of associated items are typically desired for travel along with the toothbrush itself. Specially, toothpaste, dental floss, and mouthwash or breath fresheners are often desired. In the past, travel kits have been available for carrying a collection of these items. However, such traditional kits are bulky and inconvenient because they must accommodate a six or seven inch toothbrush together with a bulky tube of toothpaste, and floss often tossed into an oversized travel case compartment. What is needed is an innovatively designed carrying case system that is extremely compact yet carries all the desired items in a very user-friendly configuration.

Regarding reusability, the traditional toothbrush wears out in two to three months' time, at which point the old brush must be disposed of, and a new brush must be purchased. Therefore, the entire toothbrush, including the substantial portion of it, which is the handle and the head, is often of poor quality and made of cheap materials so that it can be regularly replaced less expensively. What is needed is a high-quality toothbrush that has its substantial portions, namely the handle and head, made of premium materials and which never needs to be disposed of.

Regarding ecological friendliness, and environment sustainability, traditional toothbrushes are again very troublesome. This is because millions of non-biodegradable toothbrushes, made of plastics and other environmentally unfriendly materials, are thrown away every year. What is needed is a toothbrush system that minimizes any disposable elements.

SUMMARY

In exemplary embodiments of the present invention, a collapsible toothbrush and associated carrying case are provided that address the shortcomings of the traditional toothbrush and toothbrush travel inconveniences.

Specifically, an elegantly designed toothbrush is provided that is made of premium materials, will last indefinitely, and can be broken down for a portable length of roughly half to one third of the size of a traditional toothbrush. In exemplary embodiments, a carry case is provided that contains the toothbrush and associated items in a very compact and user-friendly way.

Additionally, in exemplary embodiments, a toothbrush design is presented wherein only the bristle assembly need be disposed of once well worn. Consequently, the substantial portions of the toothbrush, namely the handle and head, can be made of premium materials with premium quality because they will last indefinitely. Moreover, this configuration is environmentally friendly because the bulk of the toothbrush does not need to be disposed of. Rather, only the very small bristle assembly is regularly replaced.

BRIEF DESCRIPTION OF DRAWINGS

These and other features, aspects, and advantages of the present invention will become better understood with regard to the following descriptions, and accompanying drawings. It is to be noted, however, that the drawings illustrate only several embodiments of the invention and are therefore not to be considered limiting of the invention's scope as it can admit to other equally effective embodiments.

DETAILED DESCRIPTION

So that the manner in which the features and advantages of embodiments of methods and systems of the present invention may be understood in more detail, a more particular description of the present invention briefly summarized above may be had by reference to certain embodiments thereof that are illustrated in the appended drawings, which form a part of this specification. The drawings illustrate only certain embodiments of the present invention and are, therefore, not to be considered limiting of the scope of the present invention which includes other useful and effective embodiments as well.

Figure 1A:
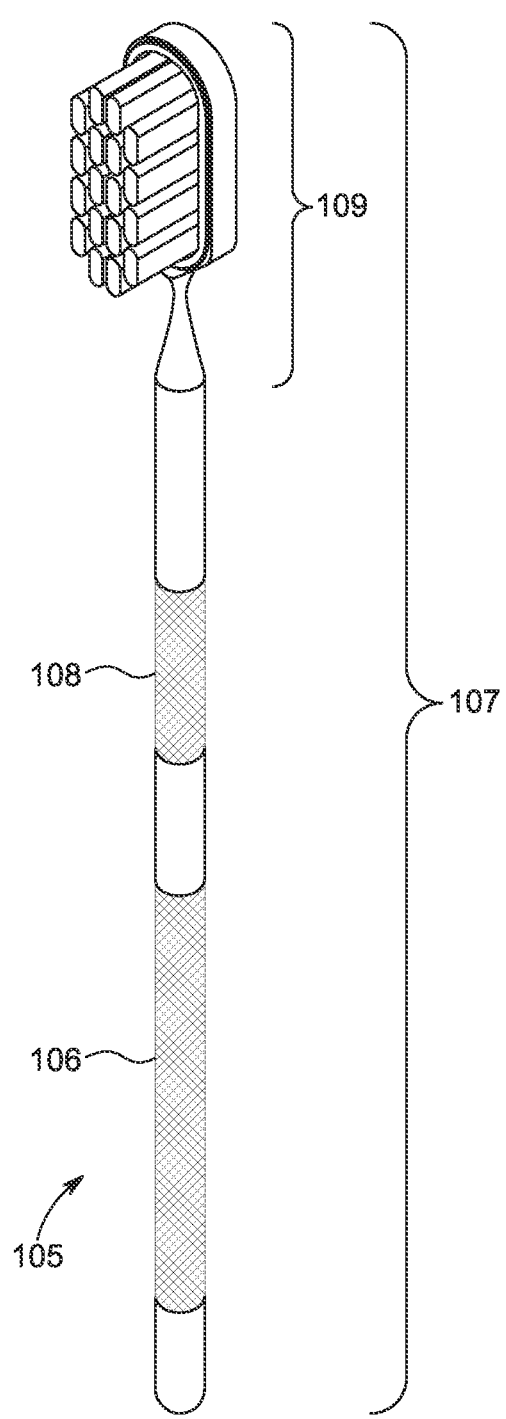
FIG. 1A is a perspective view of a fully assembled toothbrush according to one embodiment of the present invention.

Turning to the Figures, FIG. 1A is a perspective view of a collapsible toothbrush according to one embodiment of the present invention. Toothbrush 105 is shown in a fully assembled configuration. The full length of toothbrush 105 may be referred to as the toothbrush handle 107. Additionally, the top portion 109 of handle 107 may be referred to independently as the toothbrush head, toothbrush head 109.

In certain embodiment, handle 107 (including head 109) may be made of titanium or other premium quality and very durable material. It will be recognized, however, that handle 107 (including head 109) may be made of any rigid material, including environmentally friendly materials such a bamboo or other wood choices.

Additionally, handle 107 may comprise grip regions 106 and 108 that facilitate slip resistant gripping by the user. Grip regions 106 and 108 may be a knurled texture as shown. It will be recognized that many other grip enhancing configurations are possible, including slip resistant rubber overlays, for example.

Figure 1B:
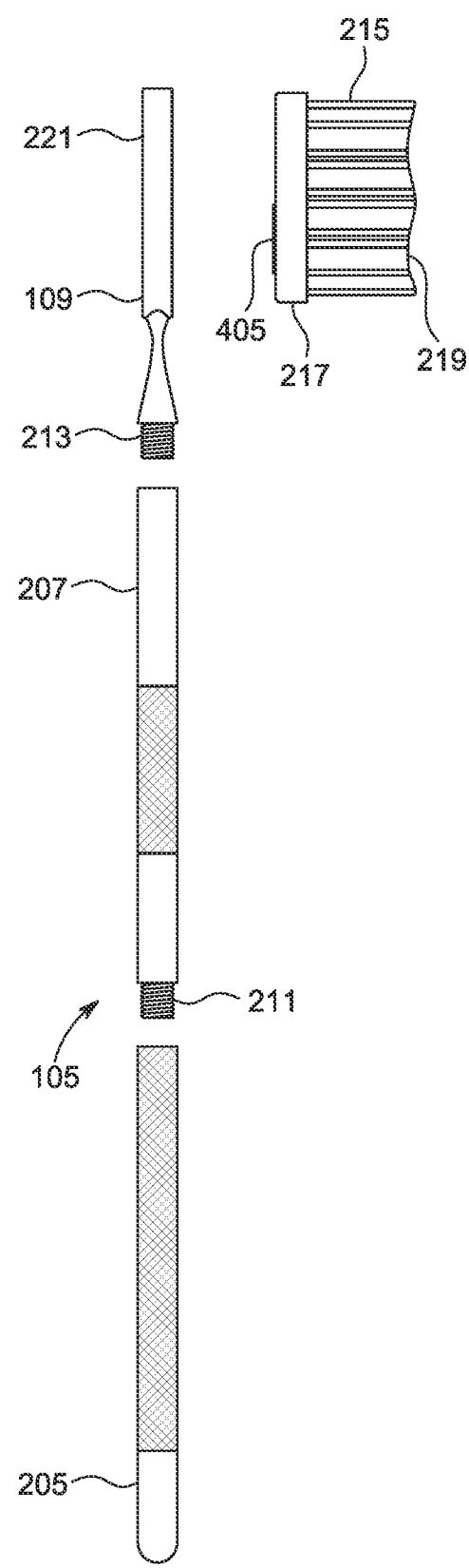
FIG. 1B is a side view of one embodiment of the present invention illustrating separable elements and a removable bristle assembly.

Turning to FIG. 1B, FIG. 1B illustrates one toothbrush embodiment in its disassembled configuration. As shown in FIG. 1B, toothbrush 105 comprises three separable handle elements 205, 207 and 109. As discussed above with reference to FIG. 1A, handle element 109 can also be referred to as head element 109.

In the embodiment illustrated in FIG. 1B, the respective separable handle elements 205, 207 and 109 can be couple to one another with threaded joints. In the illustrated example, handle element 207 comprises male threads 211 opposing female threads tapped inside handle element 205 (not shown). Consequently, handle element 207 can screw into handle element 205.

Likewise, handle element 109 comprises male threads 213 opposing female threads tapped inside handle element 207 (not shown). Consequently, handle element 109 can screw into handle element 207.

While the illustrated embodiment shows handle elements joining with threaded joints, it will be recognized that many alternative joining configurations are possible. Those include, hinged joints making the toothbrush foldable, press fit joints rather than threads, twist and lock configurations, and the like. Additionally, while three handle elements are shown, it will be recognized that toothbrush 105 could be separable into any number of handle elements for the purposes of being collapsible into a compact collection of elements.

Also shown in FIG. 1B is removable bristle assembly 215. Bristle assembly 215 comprises rear portion 217 and bristles 219. As will be shown in more detail with reference to FIGS. 1C and 1D, top portion 221 of handle (head) element 109 is shaped to snuggly receive bristle assembly 215. Consequently, as will be described in more detail, bristle assembly 215 can be removed in favor of a new bristle assemble once it is worn out from use. Bristle assembly 215 further comprises protrusion 405 which facilitates convenient insertion and removal of bristle assembly 215, as is more fully described below with reference to FIG. 1D.

Figure 1C:
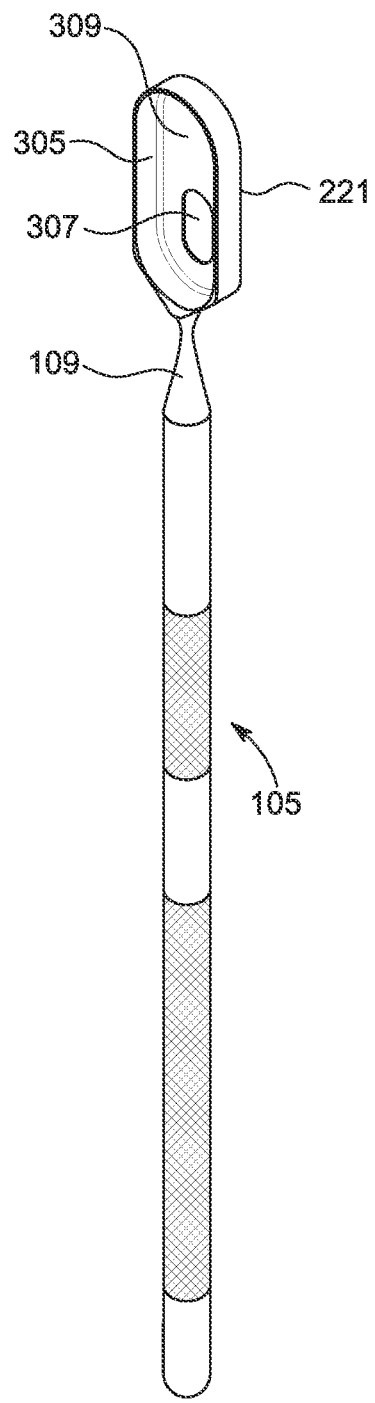
FIG. 1C is a perspective view of a toothbrush according to one embodiment of the present invention, shown without the removable bristle assembly.

Turning to FIG. 1C, FIG. 1C shows a perspective view of toothbrush 105, again fully assembled, illustrating further detail of the front of handle (head) element 109, absent the bristle assemble. Specifically, it can be seen that top portion 221 comprises a perimeter wall 305 which defines a cavity 309 that is shaped to receive removable bristle assembly 215. As described in more detail with reference to FIG. 1D, FIG. 1C illustrates opening 307 that facilitates the insertion, retention and removing of removable bristle assembly 215.

Figure 1D:
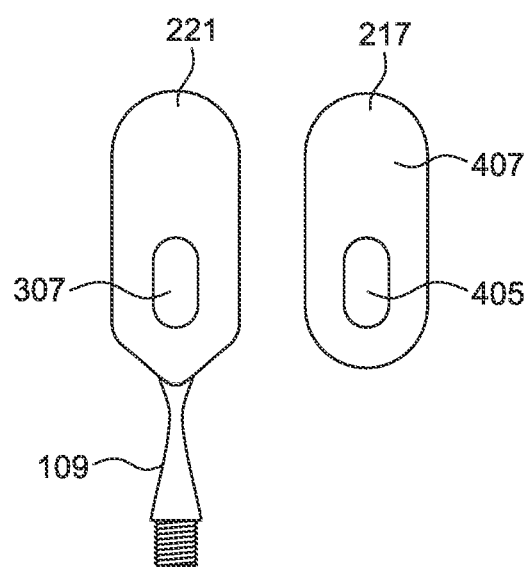
FIG. 1D illustrates the separable head element of one embodiment of the present invention, including an access opening facilitating replacing a removable bristle assembly.

More specifically, turning to FIG. 1D, FIG. 1D is a rear view of top portion 221 of handle (head) element 109, and a rear view of rear portion 217 of bristle assembly 215. Protrusion 405 extends from a rear surface 407 of rear portion 217.

Protrusion 405 is shaped to fit snuggly into opening 307 when bristle assembly 215 is received and retained in top portion 221 of handle (head) element 109. Consequently, opening 307 and protrusion 405 cooperate to align bristle assembly 215 within cavity 309 (see FIG. 1C), and to retain assembly 215 within cavity 309. Additionally, opening 307 exposes protrusion 407 so that protrusion 407 can be pressed and urged outward away from top portion 221 when assembly 215 needs to be removed from handle 107 for replacing.

Accordingly, in certain embodiments, bristle assembly 215 may be retained in cavity 309 by press-fit, cavity 309 and rear portion 217 being sufficiently close in dimension so that opposing pressure holds assembly 215 in place. It will be recognized that many alternative means of retaining assembly 215 are also viable, including employing semi-permanent adhesives, and snap-in configurations.

Figure 2A:
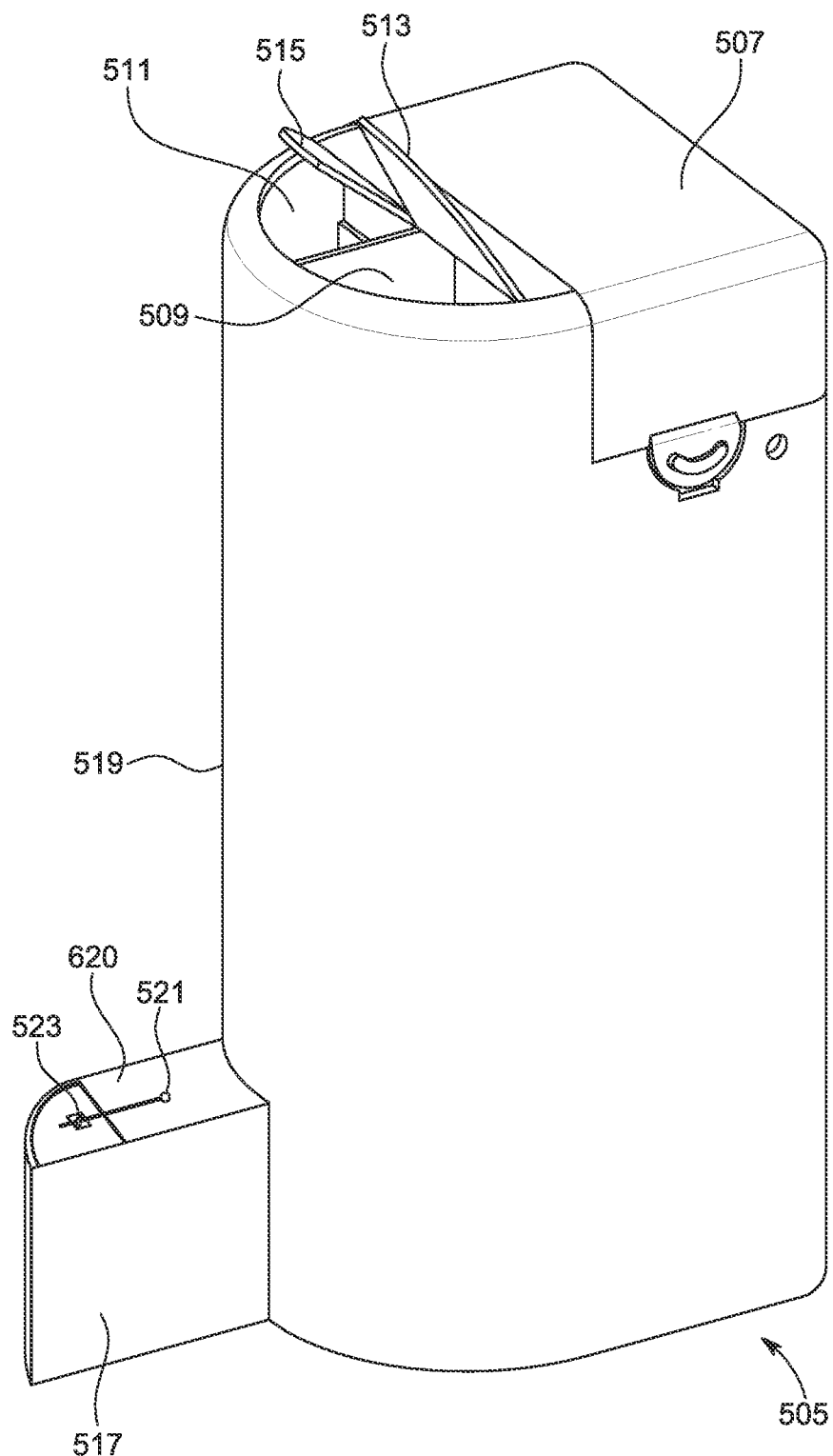
FIG. 2A is a perspective view of a carrying case according to one embodiment of the present invention.

Turning now to FIG. 2A, FIG. 2A is a perspective view of a carrying case 505 according to one embodiment of the present invention. In the illustrated embodiment, carrying case 505 comprises handle element compartment cover 507 shown in the closed position. Handle element compartment cover 507, when open, reveals individual respective handle element compartments as will be discussed in more detail with reference to FIG. 2C.

FIG. 2A further illustrates consumables compartments 509 and 511. Compartments 509 and 511 are referred to as consumables compartments because, according to certain embodiments, they are intended to hold consumables including dry toothpaste tablets and dry mouthwash tablets. Consumable compartments 509 and 511 each comprise respective compartment covers 513 and 515. In preferred embodiments, covers 513 and 515 are hinged and snap open and closed. Notably, covers 513 and 515 are separate covers such that one can be open while the other remains closed. Accordingly, in such embodiments, consumables such as dry tablets can be retrieved from one consumables compartment while avoiding emptying the contents of the other.

FIG. 2A further illustrates dental floss drawer 517. In certain embodiments, a dental floss spool is loaded into drawer 517 under drawer lid 620 (as described in more detail with reference to FIG. 2D). The floss is then threaded through thread port 521 of drawer lid 620, and then under retainer/cutter 523. As floss is needed, the user pulls on the thread and then pulls against cutter 523 at the desired length.

Drawer 517 extends slidably outwardly away from carrying case housing 519 as illustrated. When not in use, drawer 517 is pushed back so that its outer edge is flush with housing 519.

Figure 2B:
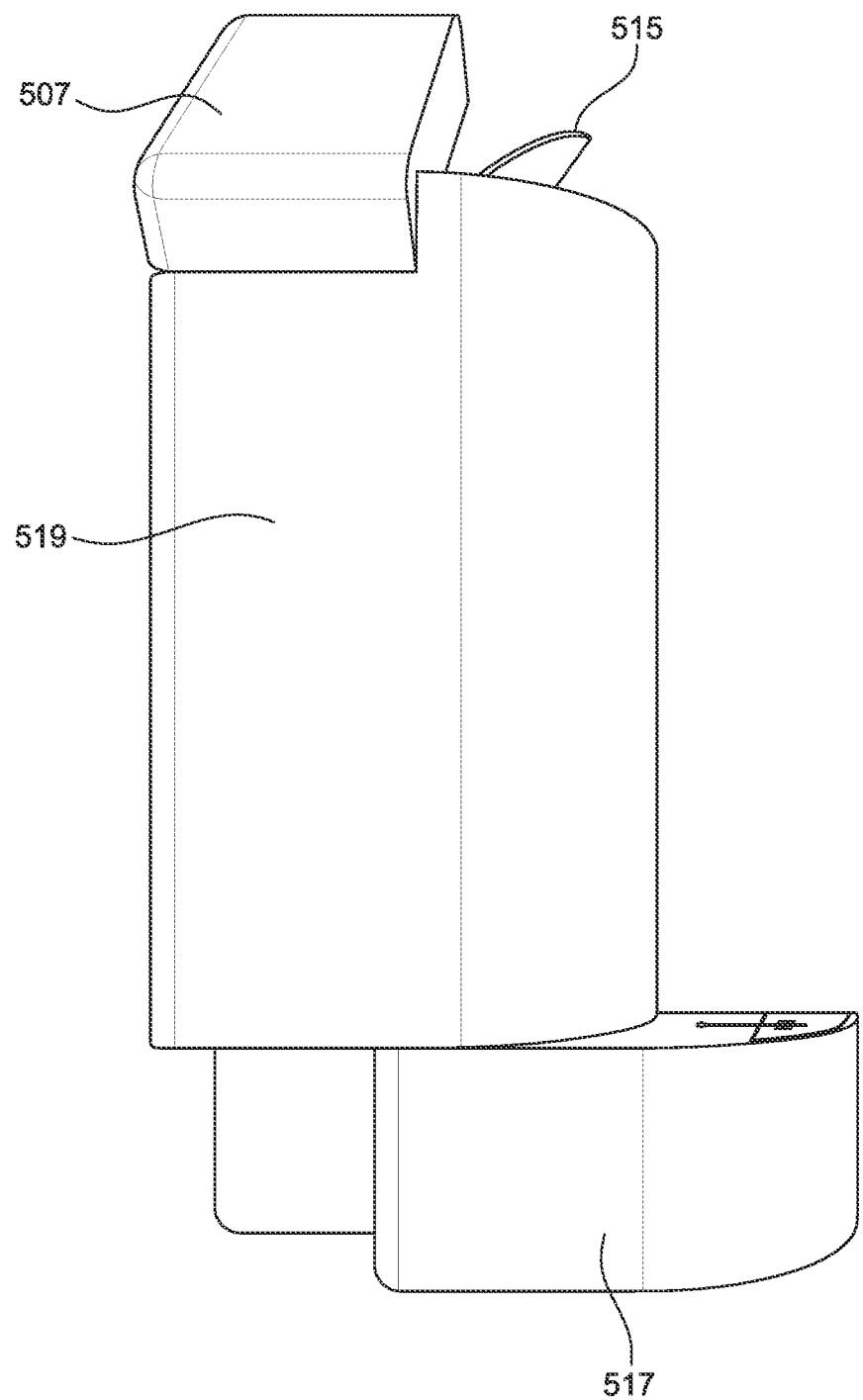
FIG. 2B is a side view of a carrying case according to one embodiment of the present invention, illustrating compartment covers and a dental floss drawer in its extended position.

Turning to FIG. 2B, FIG. 2B is a side view further illustrating the opened positions of dental floss drawer 517, handle element compartment cover 507, and consumables compartment cover 515. In certain embodiments, handle element compartment cover 507 is hinged as shown. Likewise, in certain embodiments consumables compartment cover 515 is also hinged. It will be recognized that alternative configurations may be employed, such as sliding covers.

Additionally, dental floss drawer 517 is slidably extendable away from, and retractable back towards, housing 519 by way of an integral slotted track on the flat side of drawer 517 (not shown). It will be recognized that alternative sliding mechanisms slidably coupling drawer 517 to housing 519 may be employed.

Figure 2C:
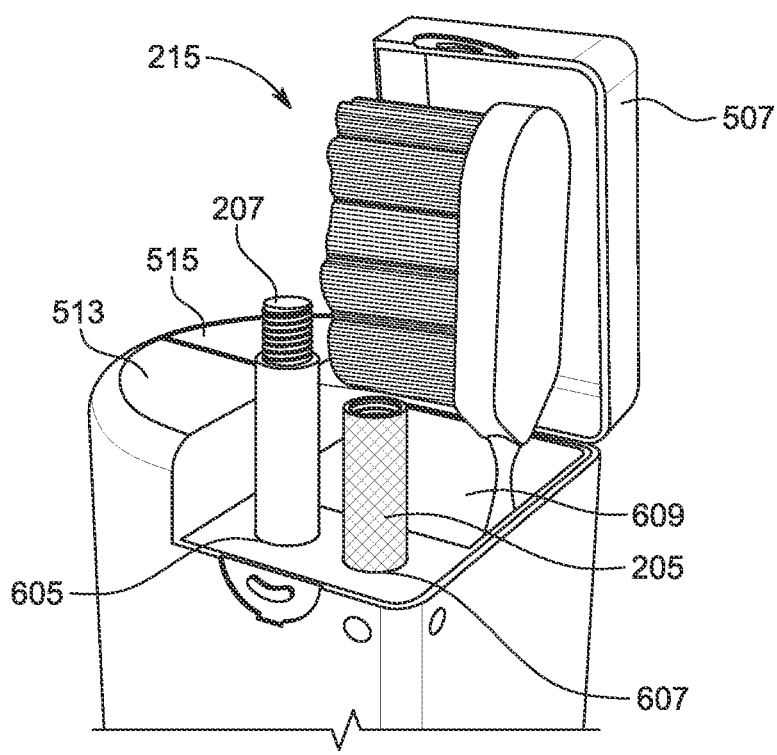
FIG. 2C illustrates handle element compartments according to one embodiment of the present invention.

Turning now to FIG. 2C, FIG. 2C shows handle element compartment cover 507 in the open position revealing handle element compartments 605, 607 and 609.

As illustrated in FIG. 2C, handle element 207 is shown inserted into handle element compartment 605. Similarly, handle element 205 is shown inserted into handle element compartment 607. Additionally, handle (head) element 109 together with retained bristle assembly 215 is shown partially inserted into handle element compartment 609.

In certain embodiments, handle elements 207 and 205 are cylindrical and therefore each have a circular cross-section. In certain embodiments handle element compartments 605 and 607 have openings that correspond in shape to the cross-section of the handle elements they are intended to receive. In the illustrated case, the openings are therefore circular.

Moreover, the dimensions of the openings of compartments 605 and 607 are substantially the same, but just slightly larger, than the dimensions (e.g. the diameter of the cross-section) of the respective handle elements. Consequently, when the handle elements are inserted in the direction of their longitudinal axis into the compartments (as shown), the elements are retained snuggly such that they cannot move substantially laterally. This configuration is particularly desirable because the handle elements do not rattle inside the carrying case when transported.

Figure 2D:
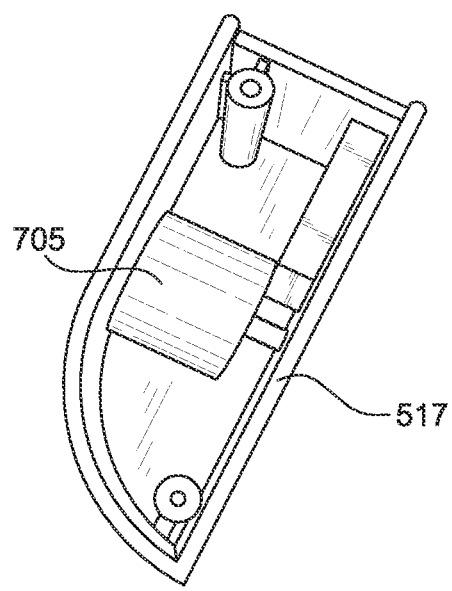
FIG. 2D is a top view illustrating the inside of a dental floss drawer that is part of a carrying case according to one embodiment of the present invention.

Turning to FIG. 2D, FIG. 2D is a top-down view of dental floss drawer 517 with lid 620 removed. FIG. 2D shows floss spool 705 which can be lifted from drawer 517 to receive a roll of dental floss. Spool 705 with floss is then inserted back into drawer 517, with a thread of floss being threaded through port 521 of lid 620 (see FIG. 2A), before lid 620 is fastened to drawer 517. Subsequently, drawer 517 is reinserted into housing 519 (see FIG. 2A), preferable snapping onto an integral track that drawer 517 slides along.

Consequently, according to the foregoing, a collapsible toothbrush and associated carrying case are provided that address the shortcomings of the traditional toothbrush and toothbrush travel inconveniences.

Specifically, an elegantly designed toothbrush is provided that may be made of premium materials, will last indefinitely, and can be broken down for a portable length of roughly half to one third of the size of a traditional toothbrush. In exemplary embodiments, a carry case is provided that contains the toothbrush and associated items in a very compact and user-friendly way.

Additionally, in exemplary embodiments, a toothbrush design is presented wherein only the bristle assembly need be disposed of once well worn. Consequently, the substantial portions of the toothbrush, namely the handle and head, are be made of premium materials with premium quality because they will last indefinitely. Moreover, this configuration is environmentally friendly because the bulk of the toothbrush does not need to be disposed of. Rather, only the very small bristle assembly is regularly replaced.

The foregoing description of the embodiments of the invention has been presented for the purpose of illustration; it is not intended to be exhaustive or to limit the invention to the precise forms disclosed. The description and drawings are, accordingly, to be regarded in an illustrative rather than a restrictive sense. The language used in the specification has been principally selected for readability and instructional purposes. It is therefore intended that the scope of the invention be limited not by this detailed description and drawings, but rather by any claims that issue based on this application. It will, however, be evident that various modifications and changes may be made thereunto without departing from the broader spirit and scope of the invention.

What is claimed is:

1. A toothbrush kit comprising:
   a toothbrush handle comprising at least two separable handle elements, a first of the separable handle elements having a handle element cross-sectional shape, and a second of the separable handle elements adapted to receive a removable bristle assembly;
   a carrying case comprising a first handle element compartment, the first handle element compartment having an opening configured to accept and contain the first handle element, the carrying case further comprising a second handle element compartment having dimensions sufficient to receive and contain the second separable handle element;
   the carrying case further comprising a first consumables compartment comprising a first consumables compartment cover, and a second consumables compartment comprising a second consumables compartment cover, the first and second consumable compartments containing a supply of dry toothpaste tablets and a supply of dry mouthwash tablets;
   the carrying case further comprising a floss drawer slidably extendable outwardly therefrom, the floss drawer comprising a thread port from which floss can be drawn;
   wherein the toothbrush kit is configured to minimize size and facilitate a reduction of plastic waste disposal, while being self-contained to fully support teeth brushing, teeth flossing, and mouth washing.

2. The toothbrush kit of claim 1, the toothbrush handle comprising at least three of the separable handle elements, the separable handle elements joinable to one another with respective threaded joints.

3. The toothbrush kit of claim 1, wherein the second separable handle element comprises an opening revealing a rear portion of the bristle assembly when the bristle assembly is retained in the second separable handle element.

4. The toothbrush kit of claim 1, wherein the first consumables compartment cover can remain closed when the second consumables compartment cover is open.

5. The toothbrush kit of claim 1, wherein the handle element cross-sectional shape is circular.

6. The toothbrush kit of claim 1, wherein the first separable handle element comprises a longitudinal axis, and wherein the first separable handle element is received in the first handle element compartment by being inserted into the compartment in the direction of the longitudinal axis.

7. The toothbrush kit of claim 1, wherein the carrying case has a first end and a second end, wherein the first consumables compartment cover and the second consumables compartment cover are located at the first end of the carrying case and the floss drawer is located at the second end of the carrying case located opposite the first end along a longitudinal axis thereof.

* * * * *